United States Patent Office 3,392,142
Patented July 9, 1968

3,392,142
CIS-DIENE RUBBERS STABILIZED WITH DITHIOCARBAMYL DERIVATIVES
Boris Nicholas Leyland, Gerald Scott, and Derek Williams, Manchester, England, assignors to Imperial Chemicals Industries Limited, London, England, a corporation of Great Britain
No Drawing. Filed Sept. 20, 1963, Ser. No. 310,496
Claims priority, application Great Britain, Sept. 24, 1962, 36,188/62
4 Claims. (Cl. 260—45.8)

This invention relates to a method of preserving synthetic rubbers, particularly cis-rubbers.

It is well known that synthetic rubbers such as butadiene/styrene copolymers are susceptible to oxidation and must be protected by antioxidants. Numerous compounds have been proposed for this purpose. The recently developed cis-rubbers such as cis-polybutadiene and cis-polyisoprene similarly require stabilization and in the absence of suitable stabilisers the former changes on exposure to air especially at elevated temperatures to a gel of higher plasticity and the latter is degraded to a polymer of lower viscosity. However many of the antioxidants proposed for the non-stereospecific synthetic rubbers are not of value in the cis-rubbers.

We have now found that certain compounds containing a dithiocarbamyl group are effective stabilizers for cis-rubbers.

According to our invention therefore we provide a process for the preservation of synthetic cis-rubbers which comprises the addition to the cis-rubber of a dithiocarbamyl compound containing one or more groups of the formula:

wherein R and $R^1$ each represent a hydrogen atom or an alkyl, aryl, cycloalkyl, substituted alkyl, or aralkyl radical, or R and $R^1$ taken together, together with the nitrogen atom, represent a piperidino or morpholino radical, each of which groups is attached to an alkyl, substituted alkyl, alkylene or substituted alkylene group, a metal atom, an ammonium or alkyl substituted ammonium group, one or more sulphur atoms, or a group

wherein R and $R^1$ have the significance given hereinbefore.

As synthetic cis-rubbers there may be mentioned particularly cis-polybutadiene and cis-polyisoprene.

As dithiocarbamyl compounds useful in the process of our invention there may be mentioned in particular metal dialkyldithiocarbamates such as zinc dimethyldithiocarbamate, zinc diethyldithiocarbamate or zinc dinonyldithiocarbamate which are especially valuable in the stabilization of cis-polybutadiene, alkylammoniumdialkyldithiocarbamates such as diethylammonium diethyldithiocarbamate, and dialkyldithiocarbamyl sulphides such as dinonyldithiocarbamyldisulphide which are especially valuable in the stabilisation of cis-polyisoprene.

Other dithiocarbamyl compounds which may be used in the process of our invention include diethyldithiocarbamylmonosulphide, and esters of dialkyldithiocarbamic acids such as 4-(diethylthiocarbamylthiomethyl)-2:6-dimethylphenol, 4-(diethylthiocarbamylthiomethyl)-2:6-di-tert.-butylphenol and 2:6-bis(piperidinothiocarbamylthiomethyl)-4-methylphenol which may be obtained by interaction of the appropriate alkylphenol, formaldehyde, carbon bisulphide and amine. These compounds are of especial advantage since they have little effect on any vulcanisation process to which the rubber may be subjected. The dithiocarbamyl compound may be added to the cis-rubbers at any time before vulcanisation, but is preferably added as soon as possible after the formation of the cis-rubber and may with advantage be added to the polymerization reaction mixture in which the rubber is prepared.

The cis-rubber may be in any form, for example solid, dispersed, in emulsion, or in solution. Other antioxidants may also be present to assist the stabilising effect, for example hindered phenols, such as 2:6-ditert.-butyl-p-cresol, or bis-phenols normally used as rubber antioxidants, such as bis(2-hydroxy-3-tert.-butyl-5-methylphenyl)methane or bis(4-hydroxy-3-tert.-butyl-6-methylphenyl)methane or arylamines such as phenyl-β-naphthylamine.

The dithiocarbamyl compound may be added in amount between 0.05 and 5% and preferably 0.1 and 1.0%, of the weight of rubber.

The rubber may also contain known adjuvants used in these compositions such as pigments, fillers, plasticisers, blowing agents, antiozonants, waxes, vulcanising agents, and vulcanisation accelerators and retarders.

The invention is illustrated but not limited by the following examples in which all parts and percentages are by weight unless otherwise stated:

EXAMPLE 1

1 part of antioxidant is incorporated into 100 parts of cis-polybutadiene on a two roll mill. The polybutadiene is then sheeted off to a thickness of about 1 mm. and portions exposed to the air at 100° C. The plasticity is determined at intervals using a Wallace Plastometer in which the compressed height of a pellet of rubber is measured under a standard load at 100° C. The results obtained together with those of a control experiment on cis-polybutadiene to which no antioxidant was added are given in Table 1, and show the efficiency of the antioxidants of our invention in hindering the formation of gel-like products of higher plasticity.

TABLE I

| Antioxidant | Time of ageing in hours | | | | |
|---|---|---|---|---|---|
| | 0 | 24 | 48 | 72 | 96 |
| | Wallace Plasticities | | | | |
| Control | 23 | 100 | | | |
| Zinc diethyldithiocarbamate | 23 | 24 | 22 | 25 | 34 |
| Dinonyldithiocarbamyl sulphide | 23 | 30 | 73 | 80 | 100 |
| Zinc dinonyldithiocarbamate | 25 | 24 | 19 | 24 | 31 |

EXAMPLE 2

1 part of antioxidant is incorporated in 100 parts of cis-polyisoprene on a mill with rolls at 70° C. The polyisoprene is then sheeted off to a thickness of about 1 mm. and these sheets exposed in a suitable manner to an oxygen atmosphere at 90° C. The times required to take up various amounts of oxygen are determined, the oxygen uptake being measured manometrically.

The results obtained together with those of a control experiment on polyisoprene to which no antioxidant was added are given in Table II, and show clearly the longer time required by the stabilised polymer to absorb significant amounts of oxygen.

TABLE II

| Antioxidant | Oxygen uptake of weight of rubber (percent) | | | |
|---|---|---|---|---|
| | 0.5 | 1.0 | 1.5 | 2.0 |
| | Time to absorb oxygen in hours | | | |
| Control | 9 | 14 | 16 | 16 |
| Zinc diethyldithiocarbamate | 13 | 50 | 94 | 118 |
| Zinc dinonyldithiocarbamate | 12 | 31 | 55 | 79 |
| Dinonyl dithiocarbamyl sulphide | 92 | 106 | 110 | 113 |
| Dinonyl dithiocarbamyl disulphide | 113 | 164 | 167 | 169 |

EXAMPLE 3

Antioxidants are tested under the conditions described in Example 1. The results are summarized below in Table III.

TABLE III

| Antioxidant | Time of ageing at 100° C. in hours | | | | | |
|---|---|---|---|---|---|---|
| | 0 | 24 | 48 | 72 | 96 | 120 | 144 |
| | | | Wallace Plasticities | | | | |
| No antioxidant | 20 | 75 | >100 | | | | |
| Lead di-n-butyldithiocarbamate | 19 | 52 | 79 | 98 | | | |
| Zinc di-n-butyldithiocarbamate | 19 | 19 | 22 | 25 | 41 | 47 | 55 |
| Antimony-di-n-butyldithiocarbamate | 20 | 19 | 23 | 23 | 32 | 36 | 36 |
| Zinc N:N-pentamethylenedithiocarbamate | 20 | 19 | 23 | 25 | 41 | 38 | 44 |
| Zinc-N-ethyl-N-phenyldithiocarbamate | 19 | 19 | 26 | 35 | 86 | >100 | |
| Bismuth diethyldithiocarbamate | 19 | 18 | 20 | 21 | 21 | 24 | 34 |
| Nickel diethyldithiocarbamate | 19 | 12 | 40 | 43 | 72 | >100 | |
| Sodium di-iso-propyldithiocarbamate | 19 | 20 | 61 | 72 | >100 | | |
| Potassiumbenzoylaminodithiocarbamate | 19 | 20 | 19 | 54 | 62 | >100 | |
| Antimony diethyldithiocarbamate | 20 | 20 | 25 | 30 | 43 | >100 | |
| 4-(diethylthiocarbamoylthiomethyl)2:6-dimethylphenol | 21 | 33 | 54 | >100 | | | |
| 2-tert-butyl-4-diethylthiocarbamoyl-thiomethyl-5-methylphenol | 21 | 18 | 25 | >100 | | | |
| 2:6-di-tert-butyl-4-diethylthiocarbamoylthiomethylphenol | 20 | 19 | 24 | 38 | 100 | | |
| 2-tert-butyl-4-diethylthiocarbamoylthiomethyl-6-methylphenol | 20 | 22 | 30 | 41 | 54 | >100 | |
| 2:6-bis-(piperidinothiocarbonylthiomethyl)-4-methylphenol | 21 | 19 | 25 | 25 | 34 | 89 | |

EXAMPLE 4

Antioxidants are tested under the conditions described in Example 2 and give the results summarized in Table IV.

TABLE IV

| Oxygen Uptake Antioxidant | (Percent) | | | |
|---|---|---|---|---|
| | 0.5 | 1.0 | 1.5 | 2.0 |
| | Time to absorb oxygen in hours | | | |
| Control | 40 | 44 | 46 | 48 |
| Zinc dibutyldithiocarbamate | 242 | 248 | 250 | 253 |
| Antimonydibutyldithiocarbamate | 379 | | 385 | 388 |
| Zinc-N-ethyl-N-phenyldithio-carbamate | 170 | 174 | 180 | 184 |
| Bismuthdiethyldithiocarbamate | 210 | 222 | 227 | 230 |
| Antimonydiethyldithiocarbamate | 270 | 275 | 278 | 280 |
| Potassiumbenzoylaminodiethyldithiocarbamate | 246 | 252 | 258 | 264 |
| 4(diethylthiocarbamoylthiomethyl)2,6-dimethylphenol | 140 | 190 | 206 | 220 |
| 2-tert-butyl-4-diethylthiocarbamoylthiomethyl-5-methylphenol | 188 | 194 | 200 | 204 |
| 2:6-di-tert-butyl-4-diethylthiocarbamoylthiomethylphenol | 360 | 368 | 376 | 388 |
| 2-tert-butyl-4-diethylthiocarbamoylthiomethyl-6-methylphenol | 232 | 268 | 292 | 312 |
| 2:6-bis-(piperidinothiocarbonylthiomethyl)-4-methylphenol | 526 | 532 | 538 | 544 |
| 2-tert-butyl-6-diethylthiocarbamoylthiomethyl-4-methylphenol | 70 | 99 | 105 | 108 |
| 2-tert-butyl-6-piperidinothiocarbonylthiomethyl-4-methylphenol | 56 | 79 | 86 | 90 |
| 2-tert-butyl-6-methyl-4-piperidinothiocarbonylthiomethylphenol | 102 | 182 | 218 | 223 |
| 2:6-di-tert-butyl-4-piperidinothiocarbonylthiomethylphenol | 84 | 143 | 155 | 160 |
| 2:6-bis-(diethylthiocarbamoylthiomethyl)-4-methylphenol | 183 | 212 | 219 | 223 |
| 2:6-bis-(morpholinothiocarbonylthiomethyl)-4-methylphenol | 88 | 124 | 139 | 146 |
| 2-n-butylthiocarbamoylthiomethyl-4-methylphenol | 23 | 51 | 77 | 89 |

EXAMPLE 5

Antioxidants are tested under the conditions described in Example 1. The results are summarized in Table V.

TABLE V

| Antioxidant | Time of ageing in hours | | | | |
|---|---|---|---|---|---|
| | 0 | 16 | 24 | 48 | 72 |
| | | Wallace Plasticities | | | |
| Control (no antioxidant) | 18 | 25 | 28 | 81 | >100 |
| 2-tert-butyl-6,diethylthiocarbamoyl-thiomethyl-4-methylphenol | 17 | 21 | 21 | 20 | 29 |
| 2-tert,butyl-6-piperidinothio-carbonylthiomethyl-4-methylphenol | 17 | 21 | 21 | 27 | 30 |
| 2-tert-butyl-6-methyl-4-piperidinothiocarbonylthiomethylphenol | 17 | 23 | 28 | 33 | 37 |
| 2:6-di-tert-butyl-4-piperidonothiocarbonylthiomethylphenol | 18 | 22 | 22 | 25 | 34 |
| 2:6-bis-(diethylthiocarbamoylthiomethyl)-4-methylphenol | 18 | 21 | 21 | 23 | 29 |
| 2:6-bis-(morpholinothiocarbonylthiomethyl)-4-methylphenol | 18 | 22 | 23 | 23 | 25 |
| 2-tert-butyl-6-cyclohexylthiocarbamoylthiomethyl-4-methylphenol | 19 | 19 | 20 | 18 | 20 |
| 2:6-bis-(cyclohexylthiocarbamoylthiomethyl)-4-methylphenol | 17 | 22 | 29 | 27 | 42 |
| 2:6-bis-(n-butylthiocarbamoylthiomethyl)-4-methylphenol | 18 | 22 | 21 | 20 | 23 |

We claim:
1. A composition of matter which comprises synthetic cis-diene rubber containing a stabilizing amount of an ester of a dialkyldithiocarbamic acid selected from the group consisting of

4-diethylthiocarbamoylthiomethyl-2,6-dimethylphenol;

2:6-di-tert.-butyl-4-diethylthiocarbamoylthiomethylphenol;

2:6-bis(piperidinothiocarbonylthiomethyl)-4-methylphenol;

2-tert.-butyl-4-diethylthiocarbamoylthiomethyl-5-methylphenol;

2-tert.-butyl-4-diethylthiocarbamoylthiomethyl-6-methylphenol;

2-tert.-butyl-6-diethylthiocarbamoylthiomethyl-4-methylphenol;

2-tert.-butyl-6-piperidinothiocarbonylthiomethyl-4-methylphenol;

2-tert.-butyl-6-methyl-4-piperidinothiocarbonylthiomethylphenol;

2:6-di-tert.-butyl-4-piperidinothiocarbonylthiomethylphenol;

2:6-bis(diethylthiocarbamoylthiomethyl)-4-methylphenol;

2:6-bis(morpholinothiocarbonylthiomethyl)-4-methylphenol;

2-n-butylthiocarbamoylthiomethyl-4-methylphenol;

2-tert.-butyl-6-cyclohexylthiocarbamoylthiomethyl-4-methylphenol;

2:6-bis(cyclohexylthiocarbamoylthiomethyl)-4-methylphenol; and

2:6-bis(n-butylthiocarbamoylthiomethyl)-4-methylphenol.

2. The composition of matter as claimed in claim 1 wherein the said ester of dialkyldithiocarbamic acid is present in an amount of about 0.05 to 5% by weight of said rubber.

3. The composition of matter as claimed in claim 2 wherein the said ester of dialkyldithiocarbamic acid is present in an amount of about 0.1 to about 1.0% by weight of said rubber.

4. The composition of matter as claimed in claim 1 which additionally includes an effective amount of an antioxidant selected from the group consisting of 2:6-di-tert. - butyl - p - cresol, bis(2 - hydroxy - 3 - tert. - butyl-5 - methylphenyl)methane, bis(4 - hydroxy - 3 - tert.-butyl-6-methylphenyl)methane and phenyl-β-naphthylamine.

References Cited

UNITED STATES PATENTS

| | | | |
|---|---|---|---|
| 2,375,042 | 5/1945 | Semon | 260—45.9 |
| 2,789,962 | 4/1953 | Groff et al. | 260—45.75 |
| 2,735,833 | 2/1956 | Stanton et al. | 260—45.9 |
| 2,974,082 | 3/1961 | Collins | 260—455 |
| 3,209,001 | 9/1965 | Csendes | 260—45.8 |

FOREIGN PATENTS

| | | |
|---|---|---|
| 802,018 | 9/1958 | Great Britain. |
| 1,278,583 | 10/1961 | France. |
| 955,078 | 4/1964 | Great Britain. |

OTHER REFERENCES

Industrial and Engineering Chemistry, "Extrusion Plasticity of a Butadiene Acrylonitrile Rubber," by A. Campbell and P. Tryon, January 1953, vol. 45, No. 1, pp. 125–128.

DONALD E. CZAJA, *Primary Examiner.*

LEON J. BERCOVITZ, *Examiner.*

V. P. HOKE, *Assistant Examiner.*